United States Patent
Reinhardt et al.

(10) Patent No.: US 6,421,049 B1
(45) Date of Patent: Jul. 16, 2002

(54) PARAMETER SELECTION FOR APPROXIMATE SOLUTIONS TO PHOTOGRAMMETRIC PROBLEMS IN INTERACTIVE APPLICATIONS

(75) Inventors: Tilman Reinhardt, Woodside; Robert Seidl, Portola Valley, both of CA (US)

(73) Assignee: Adobe Systems, Inc., San Jose, CA (US)

( * ) Notice: Subject to any disclaimer, the term of this patent is extended or adjusted under 35 U.S.C. 154(b) by 0 days.

(21) Appl. No.: 09/076,366

(22) Filed: May 11, 1998

(51) Int. Cl.[7] .................. G06T 17/00; G06T 11/00
(52) U.S. Cl. ........................ 345/420; 345/619
(58) Field of Search .................. 345/428, 420, 345/433, 679, 619

(56) References Cited

U.S. PATENT DOCUMENTS

| | | | | |
|---|---|---|---|---|
| 5,390,294 A | * | 2/1995 | Takeuchi | 345/440 |
| 5,511,153 A | * | 4/1996 | Azarbayejani et al. | 345/419 |
| 5,933,150 A | * | 8/1999 | Ngo et al. | 345/473 |
| 6,009,190 A | * | 12/1999 | Szeliski et al. | 382/154 |
| 6,016,147 A | * | 1/2000 | Gantt | 345/420 |

OTHER PUBLICATIONS

Paul S. Heckbert, "Fundamentals of Texture Mapping and Image Warping", *Computer Science Division University of California Berkeley*, pp. 1–87 (6/89).

Tzay T. Young, "Handbook of Pattern Recognition and Image Processing: Computer Vision", vol. 2, pp. 1–5.

J.M. Ogden et al., "Pyramid–Based Computer Graphics", *RCA Corp.*, Reprint RE–30–5–1, pp. 4–15, (Sep./Oct.85).

Jeremy S. De Bonet, "Multisolution Sampling Procedure for Analysis and Synthesis of Texture Images", *Computer Graphics Proceedings, Annual Conference Series*, pp. 361–368, (Aug. 3–8, 1997).

Camillo J. Taylor & David J. Kriegman, "Minizaton on The Lie Group SO(3) and Related Manifolds", *Yale University*, Technical Report No.: 9405, pp. 1–8, (4/94).

B. Vijayakumar et al., "Structure and Motion of Curved 3D Objects from Monocular Silhouettes", *Dept. of Electrical Engineering Yale University & Computer Science University of Illinois*, pp. 1–8 (1996).

Camilo J. Taylor & David J. Kriegman, "Structure and Motion From Line Segnants In Multiple Images", *Dept. of Electrical Engineering Yale University*, pp. 1–31.

(List continued on next page.)

*Primary Examiner*—Jeffery Brier
*Assistant Examiner*—Ryan Yang
(74) *Attorney, Agent, or Firm*—Blakely, Sokoloff, Taylor & Zafman LLP (57) ABSTRACT

A computer-assisted technique for providing approximate solutions to photogrammetric problems in interactive applications computes an approximate solution to a large, non-linear system by converting the non-linear system into a smaller, linear system where only a subset of the system's parameters are used. The size of the smaller system can be adjusted to different system capabilities and/or model complexities to ensure computation of an approximate solution in a given time. For use in an interactive environment, this time may be adjusted so that redraw rates are within acceptable tolerances, say from 5 to 30 frames per second. The method may allow for drawing a three-dimensional representation of a scene using parameterized primitives having constraints which are updated interactively, so as to minimize error in constrained locations of the primitives. Such drawing may include creating a Jacobian matrix for a predetermined minimum set of parameters of the primitives. Creating the Jacobian matrix may include searching for parameters of the primitives which can be updated to reflect constraint requirements introduced by user interaction, up to the predetermined minimum set of parameters. The present invention thus allows for interactive manipulation of computer displayed objects represented in three-dimensional form.

15 Claims, 8 Drawing Sheets

OTHER PUBLICATIONS

Shenchang Eric Chen & Lance Williams, "View Interpolation for Image Synthesis", *Apple Computers, Inc.*, pp. 279–288 (1993).

Youichi Horry et al., "Tour Into the Picture: Using a Spidery Mesh Interface to Make Animation from a Single Image", *Computer Graphics Proceedings, Annual Conference Series*, pp. 225–232 (1997).

Richard Szeliski and Heung–Yeung Shum, "Creating Full View Panoramic Image Mosaics and Environment Maps", *Siggraph*, pp. 251–258 (Aug. 3–8, 1997).

Steven M. Seitz and Charles R. Dyer, "View Morphing", *Computer Graphics Proceedings, Annual Conference Series*, pp. 21–30 (1996).

Marc Levoy and Pat Hanrahan, "Light Field Rendering", *Computer Graphics Proceedings, Annual Conference Series*, pp. 31–42 (1996).

Steven J. Gortler et al., "The Lumigraph", *Computer Graphics Proceedings, Annual Conference Series*, pp. 43–54 (1996).

James D. Foley et al., "Computer Graphics: Principles and Practice", *Addision–Wesley Publishing Company*, Second Edition pp. 603–647 (1987).

\* cited by examiner

$$J = \begin{array}{c|c|c|c|} & L & W & H \\ \hline \text{Pin706.x} & \dfrac{\partial \text{Pin706.x}}{\partial L} & \dfrac{\partial \text{Pin706.x}}{\partial W} & \dfrac{\partial \text{Pin706.x}}{\partial H} \\ \hline \text{Pin706.y} & \dfrac{\partial \text{Pin706.y}}{\partial L} & \dfrac{\partial \text{Pin706.y}}{\partial W} & \dfrac{\partial \text{Pin706.y}}{\partial H} \\ \hline \text{Pin708.x} & \dfrac{\partial \text{Pin708.x}}{\partial L} & \dfrac{\partial \text{Pin708.x}}{\partial W} & \dfrac{\partial \text{Pin708.x}}{\partial H} \\ \hline \text{Pin708.y} & \dfrac{\partial \text{Pin708.y}}{\partial L} & \dfrac{\partial \text{Pin708.y}}{\partial W} & \dfrac{\partial \text{Pin708.y}}{\partial H} \\ \hline \end{array}$$

rows: constraints p0
columns: parameters q

Fig. 8

PARAMETER SELECTION FOR APPROXIMATE SOLUTIONS TO PHOTOGRAMMETRIC PROBLEMS IN INTERACTIVE APPLICATIONS

FIELD OF THE INVENTION

The present invention relates to methods for determining approximate solutions to large, sparse linear systems and, in particular, to the applications of such methods in the fields of photogrammetry and computer-assisted three-dimensional modeling.

BACKGROUND

Three-dimensional modeling, which is now a subset of the larger field of computer graphics, has become popular in a number of areas, for example, as applied in computer-aided design of architecture industrial design and construction. As has been recognized in these and other fields, it is often desirable to have a three-dimensional model, complete with a description of shape, location, orientation and material surface properties (i.e., texture), in order to produce realistic renderings on a computer which can be used to document a new design of a city, a building or an object. The model can also be used for computer animations, virtual reality immersion of users in a scene or for manufacturing tasks.

Image assisted modeling may be regarded as a subset of three-dimensional modeling in that the model is produced from an image, rather than from scratch. In the field of image assisted modeling, a user manipulates a three-dimensional model of a scene (perhaps represented as a computer-generated graphical representation of the scene) interactively, to fit the scene to a given image. From the point of view of the software algorithm which allows such manipulation, this requires solving the basic photogrammetric equation $$p=f(q), \text{ with constraints } p=p0 \qquad (1)$$

where p is the vector of coordinates of vertices of points of the model and q is the vector of parameters of the model. The vector p0 denotes the user specified locations of these points on the image. Function f maps the parameters q first into three-dimensional vertex coordinates in a world space, then second through a camera projection into camera space, and third, into a screen space for presentation to the user. In the general case where non-orthographic cameras are used to take the source image, f is non-linear with respect to q.

Because in general, (1) defines a non-linear system, solving (1) is commonly done by first converting it to a linear system, for example, using a first order Taylor series expansion, where J is the Jacobian of f (i.e., the derivatives of all elements of p with respect to all elements of q):

$$p0=f(q)+J.dq/dt \qquad (2)$$

where is used to represent the product of a matrix with a vector. Equation (2) is then integrated over time to yield a solution.

For photogrammetric problems. J is large and sparse (i.e., mostly zero). While integrating (2) over time, one must recompute J for each new time step and solve the corresponding linear system. This solution process is roughly O(n*m), where n is the number of elements of p and m is the number of elements of q. Because of the complex computations involved, previous approaches to such modeling problems often involve algorithms that run in "batch" mode.

That is, a user must create all of the input data (e.g., vertices edges, associations, etc.) and then invoke the modeling method. The modeling algorithms then complete all of the required calculations before providing any feedback to the user. Sometimes, because of inconsistent or undetermined input information or due to singularities in the modeling algorithms themselves, these batch processes cannot return correct or even useful models. Even worse, such algorithms often provide little or no indication of what the cause of the problem was or where the user might correct the input information to resubmit to the batch process.

A recently published method (Paul Debevec et al., "Modeling and Rendering Architecture from Photographs: A Hybrid Geometry- and Image-Based Approach", *University of California Berkeley Technical Report UCB-CSD-96-893*, January 1996) somewhat simplifies this situation by not having to deal with geometry at a vertex, then edge, then face level, but rather with primitives such as boxes or cylinders. The method requires a user to first create a parameterized (or rough) model of the objects in the scene using a separate editor. Second, the user draws edges on top of one or more photographs. Third, the user marks each edge in each photograph as corresponding to a particular edge in the parameterized model. The method then calculates values for the parameters in the model. This work is based on concepts and mathematics from Camillo Taylor and David Kriegman of Yale University, as reported in "Structure and Motion from Line Segments in Multiple Images", Yale University, Technical Report #94026, January 1994. Although somewhat less labor intensive than previous techniques, the Debevec method (known as Facade) still requires three, individually intensive, steps and the user must be skilled enough to build a parameterized model independent of the photographs.

Other reported methods, e.g., Michael Kass "CONDOR: Constraint-Based Dataflow", *SIGGRAPH '92*, pp. 321–330 (Jul. 26–31, 1992) and Michael Gleicher and Andrew Witkin, "Through-the-Lens Camera Control", *SIGGRAPH '92*, pp. 331–340 (Jul. 26–31, 1992), use data structures known as a dataflow network to create the required Jacobian matrix for providing iterative solutions to the modeling problem. For example, Gleicher and Witkin show how to apply traditional keyframing techniques to existing three-dimensional models and how to then solve for camera positions. However, in this technique, no modeling is done on top of an image nor is any texture extraction provided.

In general then, existing modeling techniques have not provided solutions to the photogrammetric equation (1) which allow for interactive use. Of course, in other fields much attention has been paid to the solution of sparse matrices. For example, parameter separation is a known technique for solving non-linear least squares problems. See, e.g., Ake Bjorck "Numerical Methods for Least Squares Problems", SIAM (1996). Unfortunately though, these techniques cannot be used for all functions f. Other methods exploit specific sparsity structures of a matrix or specific small changes to the linear system represented thereby. See, e.g., William H. Press et al., *Numerical Recipes in C* (1988). These techniques, however, do not adapt well to interactive situations.

In light of the need for computer-generated three-dimensional models, but given the shortcoming of prior schemes for solving the photogrammetric equation, it would be desirable to have an improved computer-assisted technique for solving such problems in an interactive environment.

SUMMARY AND OBJECTIVES OF THE INVENTION

Thus, one object of the present invention is to provide an improved computer-assisted technique for solving photogrammetric problems in an interactive environment.

In one embodiment, the present invention provides a computer-assisted technique for providing approximate solutions to photogrammetric problems in interactive applications, for example, image assisted modeling applications wherein a three-dimensional model is constructed on top of one or more images. Rather than directly solve the system described by equation (2) above, the present invention computes an approximate solution which can be used to quickly redraw and update the model for presentation to the user. In other words, the techniques of the present invention allow for an efficient conversion of the full problem described by (2) into a smaller problem where only a subset of the model's parameters are used. The size of the smaller problem can be adjusted to different system capabilities and/or model complexities to ensure computation of an approximate solution in a given time. For use in an interactive environment, this time may be adjusted so that redraw rates are within acceptable tolerances, say from 5 to 30 frames per second.

By way of example, the computer-assisted method may allow for drawing a three-dimensional representation of a scene using parameterized primitives having constraints which are updated interactively, so as to minimize error in constrained locations of the primitives. Such drawing may include creating a Jacobian matrix for a predetermined minimum set of parameters of the primitives. Creating the Jacobian matrix may include searching for parameters of the primitives which can be updated to reflect constraint requirements introduced by user interaction, up to the predetermined minimum set of parameters. The present invention thus allows for interactive manipulation of computer displayed objects represented in three-dimensional form.

Other objects, features and advantages of the present invention will be apparent from the accompanying drawings and the detailed description which follows.

BRIEF DESCRIPTION OF THE DRAWINGS

The present invention is illustrated by way of example and not limitation in the figures of the accompanying drawings in which.

DETAILED DESCRIPTION

Described herein is a computer-assisted technique for providing approximate solutions to photogrammetric problems in interactive applications. The technique is especially useful in image assisted modeling applications wherein a three-dimensional model is constructed on top of one or more images such that the model's parameters automatically match those of objects depicted in the images. The present invention recognizes that in order to continuously solve the linear system described in (2) above, and reproduced here:

$$p0 = f(q) + J.dq/dt, \quad (2)$$

during user interaction (i.e., while manipulating parameters of the model), what is needed is not an exact solution, but rather an approximate solution which can be used to quickly redraw and update the model for presentation to the user.

The technique allows for an efficient conversion of the full problem described by (2) into a smaller problem where only a subset of parameters q are used. The size of the smaller problem can be adjusted to different system capabilities (e.g., processor speeds) and/or model complexities to ensure computation of an approximate solution in a given time. The method recognizes that: (a) given a previous constraint vector p0, a solution for equation (2) is known; (b) the change to a new constraint vector p0 only involves a few elements of p0; and (c) J is sparse and known with respect to a previous constraint vector p0.

To illustrate, assuming that a user only makes a change to a small subset of the elements p0, a subset called p0*, the present invention then solves:

$$p0 = f(q) + J^*.dq^*/dt \quad (3)$$

so that q is a good approximation to the true solution of (2). Note that only elements of q* will change because those are the only elements integrated over time. Also note that J* denotes a smaller Jacobian which describes the derivatives of all elements of p with respect to q*.

The present invention allows choosing the number of elements of q* freely (e.g., anywhere from 0 to the number of elements of q), so that one can adjust the time it takes to solve (3) (e.g., from 0 to the time it takes to solve (2)). For use in an interactive environment, one can adjust this time so that redraw rates are within acceptable tolerances, say from 5 to 30 frames per second. It is also beneficial to adjust the size of q* to the amount of change of the constraints p0 (e.g., while the user drags the model precision is not of primary concern so the size of q* may be kept small to achieve fast redraws; as the user stops dragging, the size of q* may be increased to increase precision).

The present invention thus allows for interactive manipulation of computer displayed objects represented in three-dimensional form. Before describing further details of the techniques for generating approximate solutions to photogrammetric problems, however, it may be helpful to provide a brief description of the relevant components of an exemplary computing environment within which the present invention may find application. Afterwards, a brief description of a method of modeling a scene depicted in an image is presented. A more complete discussion of these methods may be found in co-pending Application No. 09/062512, entitled "Method and Apparatus for Image Assisted Modeling of Three-Dimensional Scenes" filed Apr. 17, 1988, by Tilman Reinhardt and Robert Seidl and assigned to the Assignee of the present application, incorporated herein by reference.

Figure 1:
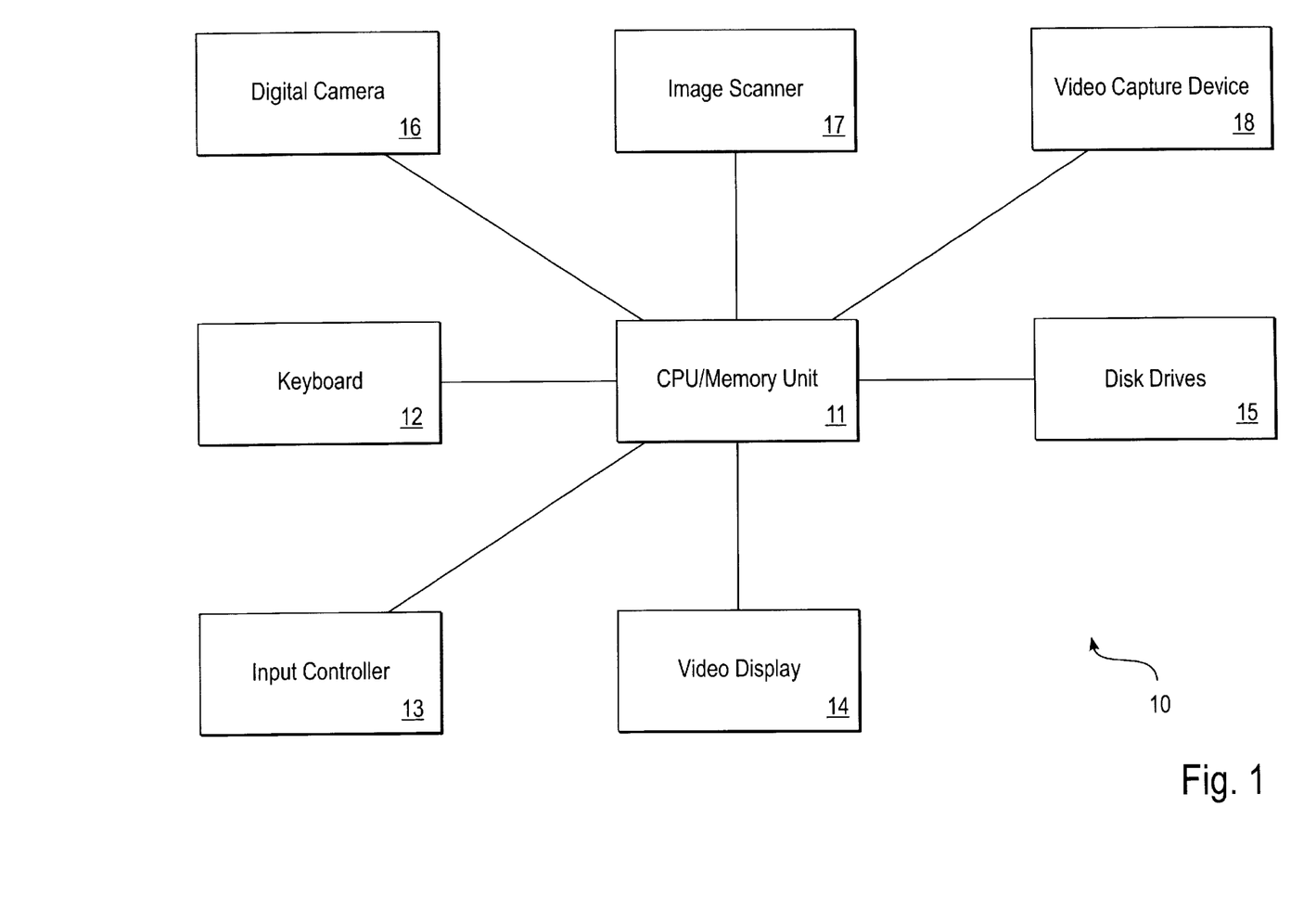
FIG. 1 depicts a generalized block diagram of a computer system as might be used by the present invention.

FIG. 1 is a generalized block diagram of a computer system 10 which includes a central processing unit (CPU) 11. CPU 11 generally includes one or more general purpose processors and one or more memory units, usually in the form of read/write memory (RAM) and/or read only memory (ROM). Application programs, for example a three-dimensional modeling program which makes use of the techniques of the present invention, may be loaded into RAM (e.g., from another storage medium) for execution by one or more of the general purpose processors which comprise CPU 11. In other cases, computer readable instructions which comprise an embodiment of the present invention may be stored in ROM or other non-volatile media, or downloaded from a source of such instructions (e.g., via a computer network and/or the network of networks commonly referred to as the Internet) for execution by CPU II.

Computer system 10 also includes a keyboard or other alphanumeric input device 12 which is coupled to (e.g., via one or more busses) and provides user input to CPU 11 as does a two-dimensional input controller 13. Two-dimensional input controller 13 may, by way of example, be a mouse, trackball, stylus or other input device. Images may be provided to CPU 11 via image scanning device 17, video capture device 18 (e.g., which is able to extract still images from a video signal) and/or digital camera 16, each or any of which may be coupled to CPU 11 via one or more connectors and/or busses.

Disk drive unit(s) 15 (or other long term storage media) may also coupled to CPU 11 and may be used for storing the digital images and geometric and texture data for three-dimensional models as well as computer readable instructions which comprise an embodiment of the present invention. Display output is provided by a video display unit 14 coupled to CPU 11. Video display unit 14 may be a conventional display such as a liquid crystal display (LCD) or other display device.

Digital images can be created by scanning existing photographs or printed material into the computer system 10 and storing same in memory or on disk drive 15. This may be accomplished, for example, using a software application which, when executed by CPU 11, allows still images to be captured from a video (e.g. as a frame of the video) and stored to memory. Alternatively, the output of digital camera 16 or scanner 17 may be downloaded to memory and/or long term storage. In this way, one or more digital images may be stored and later used by a software application which employs the techniques of the present invention.

Figure 2:
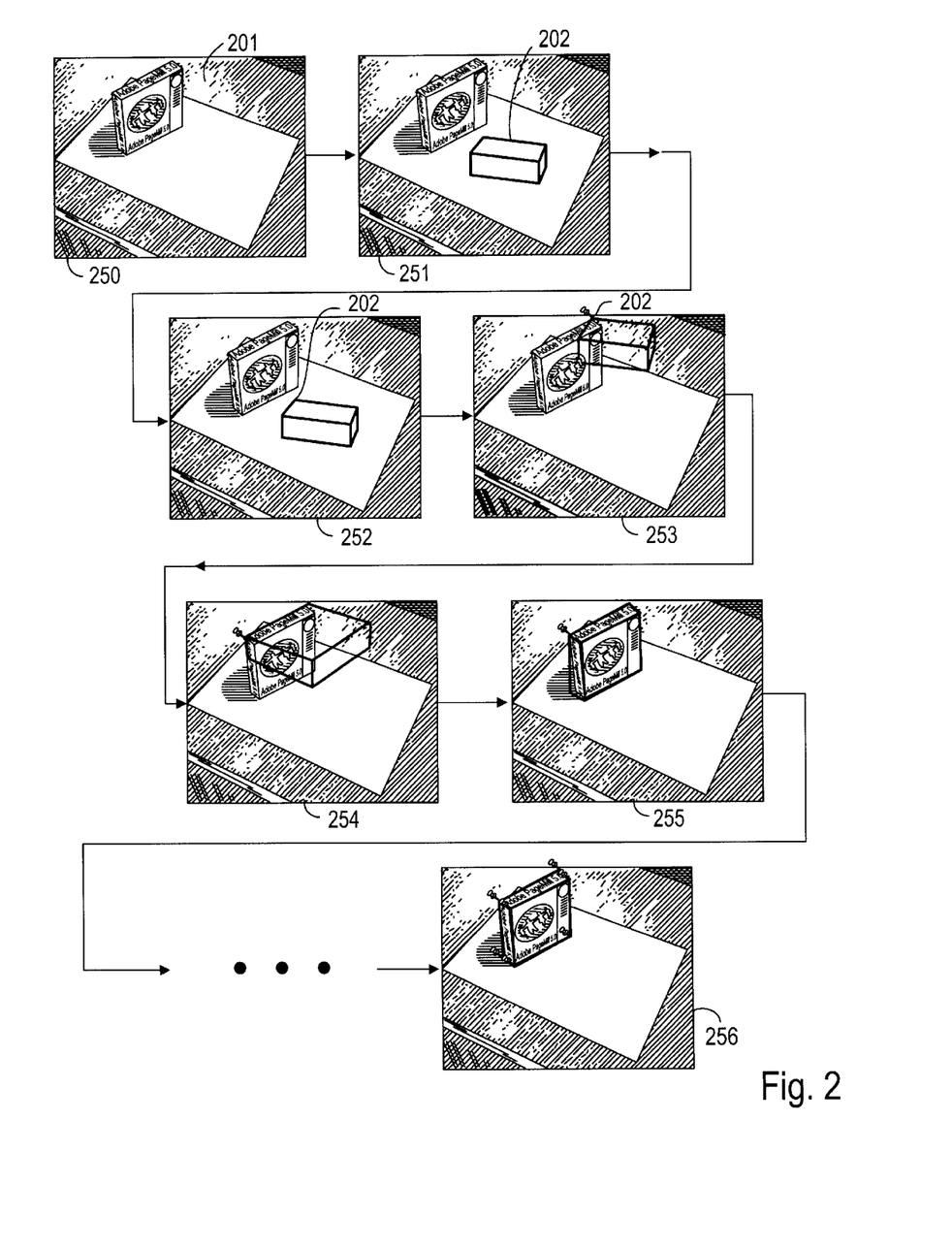
FIG. 2 illustrates a user-supplied image overlaid with a wireframe of a primitive and constraints.

FIG. 2 now illustrates a general method of creating a digital model which makes use of the methods of the present invention. Having loaded a digital image 201 (step 250), a user may then create one or more objects known as primitives (e.g., boxes, pyramids, cylinders, or other three-dimensional objects) which approximate the objects shown in the digital images (step 251). A wireframe rendering 202 of the primitives may be displayed over top of the digital image 201 (i.e., the digital representation of the photograph). The objective then is for the user to manipulate the wireframe primitive rendering 202 using the methods of the present invention, until the wireframe precisely (or neatly precisely) coincides with the object it represents in the digital image (steps 252, 253, 254, 255 and 256). Thus, the user creates a geometric model (from the primitive(s)) right on top of the digital image 201 (i.e., the photograph(s)), without requiring the use of separate editors, windows or views. In the example shown in FIG. 2 a wireframe rendering 202 of a rectilinear box is manipulated until it coincides with the outline of a box shown in the digital image 201.

The two-dimensional wireframe rendering 202 of the primitive may be created from its predefined three-dimensional representation by projecting the geometry of the primitive through a virtual camera. Parameters for the virtual camera, such as position, orientation, focal length, etc., are found (e.g., as the wireframe primitive representation 202 is aligned with the object it represents in the digital image 201) such that projection through the virtual camera yields the same two-dimensional projected geometry as is visible in the underlaid digital image (i.e., the underlaid photograph) 201. If more than one digital image (photograph) 201 is provided, then multiple virtual cameras (e.g., one for each image) may be created and the corresponding camera parameters estimated therefore. At the same time, parameters for each of the primitives (e.g., length, width, height, orientation and location in space) overlaid on the digital image are determined.

Figure 3:
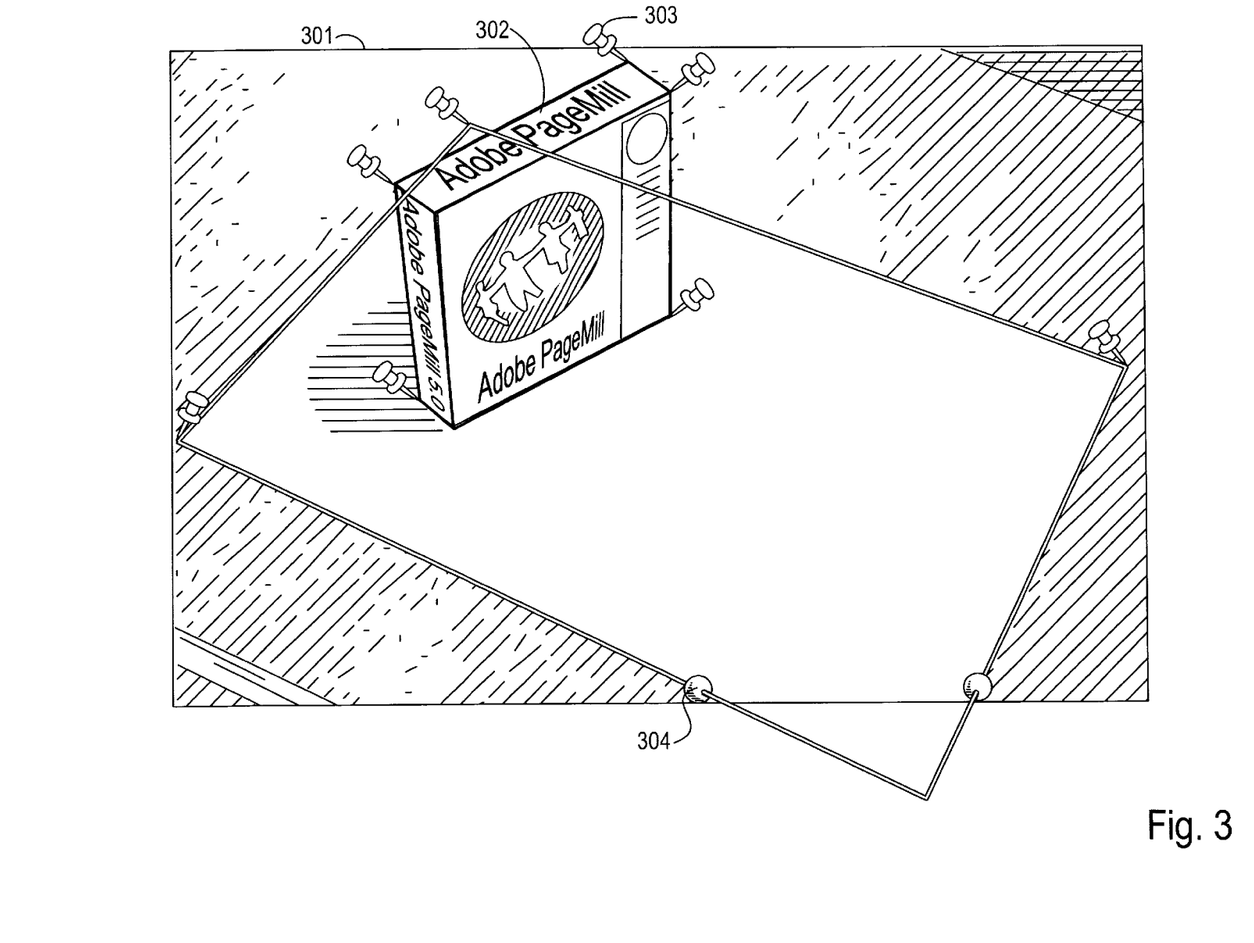
FIG. 3 illustrates the use of constraints to align wireframe representations of primitives to objects in a digital image in accordance with the present invention.

To accomplish these objectives, as the user manipulates the wireframe renderings 202 of the primitives to align the wireframe with the underlaid image 201, constraints are added to "fix" the wireframe 202 to the image 201. For example, as shown in FIG. 3, constraints 303, 304 which constrain or fix the location of corners or edges of the wireframe projections 302 to the locations in the image 301 to which they correspond or to constrain geometrical relationships between the primitives in their three-dimensional representations are added. As the constraints are introduced into the model, new estimates for all parameters of the primitives and virtual camera(s) are calculated. Based on these new parameters, the geometric coordinates of each primitive can be calculated and projected through each virtual camera to yield an updated projected wireframe graphical representation overlaid on the image and displayed to the user. The present inventions minimizes the amount of change in parameters which, with frequent enough incremental re-evaluations and reprojections yield a smooth movement of the wireframe, thus providing the user with the illusion of manipulating real three-dimensional objects made of springs or an elastic-like material. Further details regarding the various types of constraints which may be used to fix the wireframe projection to the image may be found in co-pending Application No. 09/062512.

To illustrate the solution embodied in the present invention consider the following. Call the vector of the relevant parameters, including the primitive and virtual camera parameters, "q". Call the set of two-dimensional points necessary to display a wireframe representation of the primitive on the display "p". Then, p is a function of q, or:

$$p=f(q). \tag{4}$$

As discussed above, it is mathematically impractical to solve equation (4) for q, given a set of desired constraint locations. Instead, the problem is solved by specifying dp/dt=p−p0, where p0 are the constraints, as a distance of actual (projected) and displayed (constrained) two-dimensional locations, calculating dq/dt and integrating that quantity continuously, yielding values for parameters q that can be used to update the screen display.

As is known to those of ordinary skill in the art, for a vector of constraint locations, the quantity df/dq is a derivative matrix called the Jacobian, usually denoted by "J". For the present application, the elements of J depend on the parameters of the primitives which make up the three-dimensional model and their associated constraints. For example, consider the wireframe rendering of rectilinear box primitive 700 illustrated in FIG. 7. Box primitive 700 has parameters length (L), width (W) and height (H) and is constrained at two of its vertices 702 and 704 by pin constraints 706 and 708, respectively. Pin constraints 706 and 708 intuitively correspond to push pins which may be used to affix notes or other items to a cork board, e.g., on a refrigerator or at a desk or other workspace. To a user, when a pin constraint is used, it appears that a corner of a projected wireframe is pinned to an underlaid image (not shown) at a particular location determined by the user and defined by the location of the pin. Mathematically, this states that the distance between the pin constraint's location and the projection of the corner of the wireframe should be zero. Note that because the wireframe is presented on a two-dimensional screen, the pin constraints need only be defined in two-dimensional (e.g., x and y) coordinates (of course, in general, constraints may have x, y and z coordinates).

Figure 7:
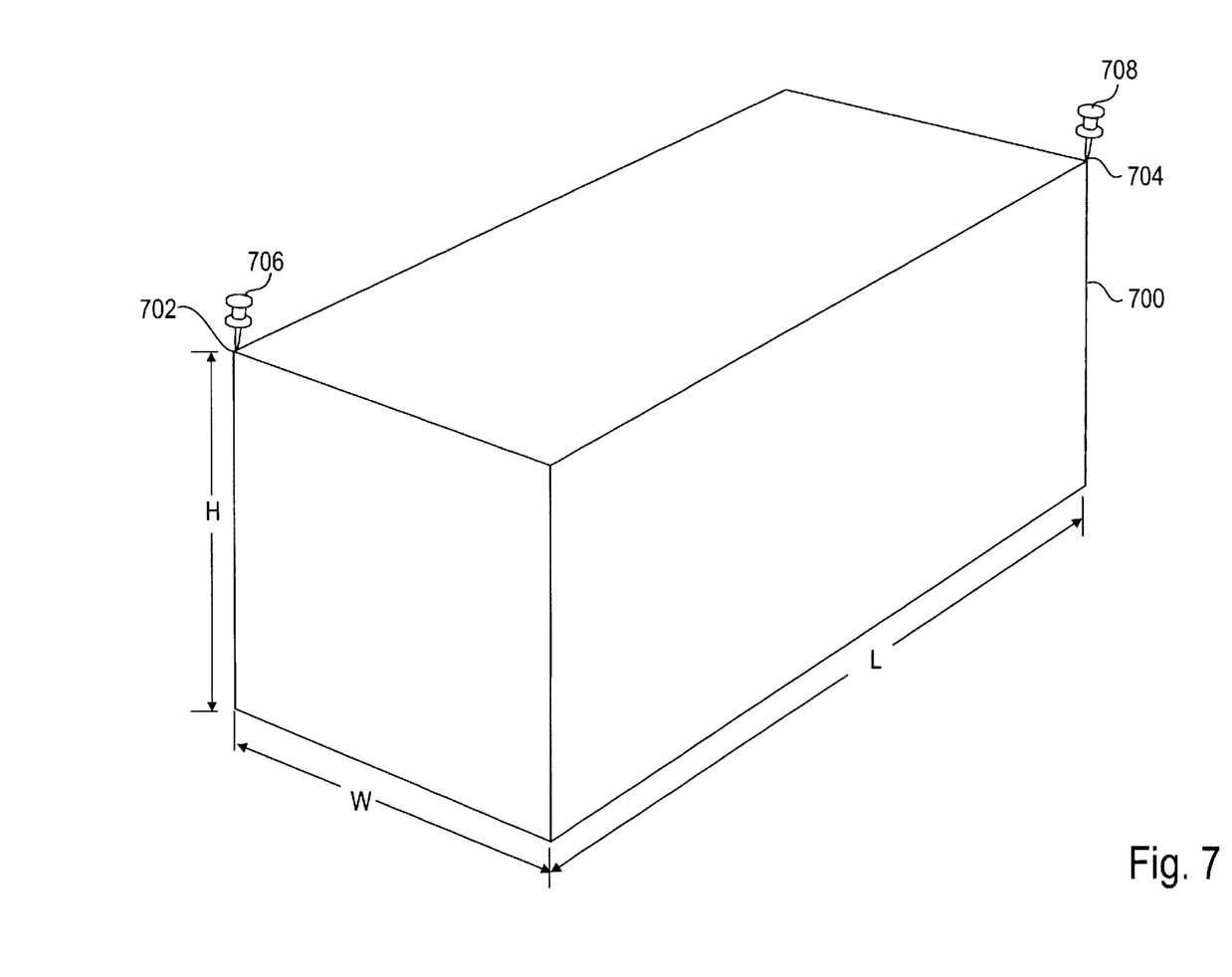
FIG. 7 illustrates a wireframe rendering of a rectilinear box primitive having two constraints.
Figure 8:
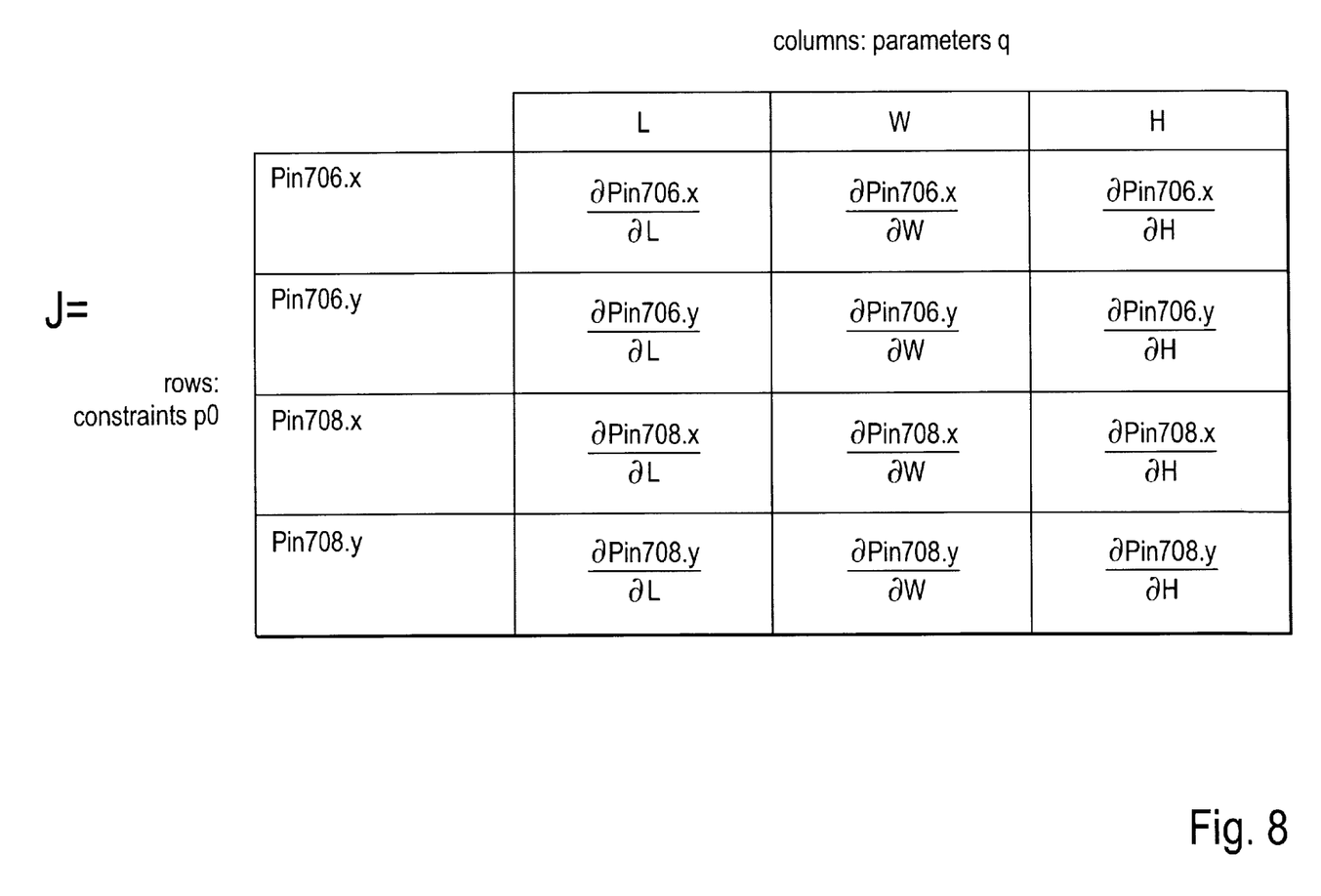
FIG. 8 illustrates the Jacobian for the rectilinear box primitive shown in FIG. 7.

A Jacobian describing box primitive 700 will have columns corresponding to the primitive's parameters q, (i.e., L, W and H) and rows corresponding to the spatial locations of the constraints. The individual elements of the matrix are the derivatives of the constraints' locations with respect to the primitive's parameters as shown in FIG. 8. These entries describe, for example, how much of a change in the x and/or y location of a constraint is introduced for a corresponding change in one (or more) of the parameters of box primitive 700.

Thus, like p, matrix J is a function of the parameters q. J can be calculated from knowledge of Current parameter values q1 and the function f which is typically a combination of several functions, such as local-to-global coordinate transformations, camera coordinate transformations, perspective divisions and screen coordinate transformations. Rather than calculating the compound derivative (which can be quite complex), the chain rule can be employed:

$$J = df(g^1(q), g^2(q), \ldots)/dq = df(g^1(q))/dg^1 * dg^1(q)/dq + df(g^2(q))/dg^2 * dg^2/dq + \ldots; \quad (5)$$

where $dg^1(q)/dq$, etc. may also be expanded if necessary

There may be many possible values of q which satisfy the relationship of equation (5). The present invention chooses a technique which evaluates the smallest value, i.e., the minimum change required to update the parameter values. In an interactive, incrementally updated feedback loop to the user, this is important as the display will not make sudden, unexpected jumps which might otherwise be encountered if other update schemes were employed. Therefore, a least squares formulation is used, and the problem becomes:

$$\text{minimize}(E) = 0.5 * dq/dt \cdot dq/dt \text{ subject to } dp/dt = J * dq/dt \quad (6)$$

where, . indicates the dot product, and E is an error function, sometimes called an energy function.

Using a technique known in the art as Lagrange multipliers, one solves the linear system:

$$dp/dt = JJ^T k \quad (7)$$

where, k is an intermediate result called the Lagrange multiplier, and then evaluates:

$$dq/dt = J^T k \quad (8)$$

which yields one desired result dq/dt for one timestep. Equations (7) and (8) are now used repeatedly to evaluate dq/dt for each timestep and to integrate q over time, for example using well known Euler or Runge Kutta methods. This yields an updated parameter vector q and, periodically, this q is used to redraw the wireframe representation to provide the user with visual feedback.

Figure 4:
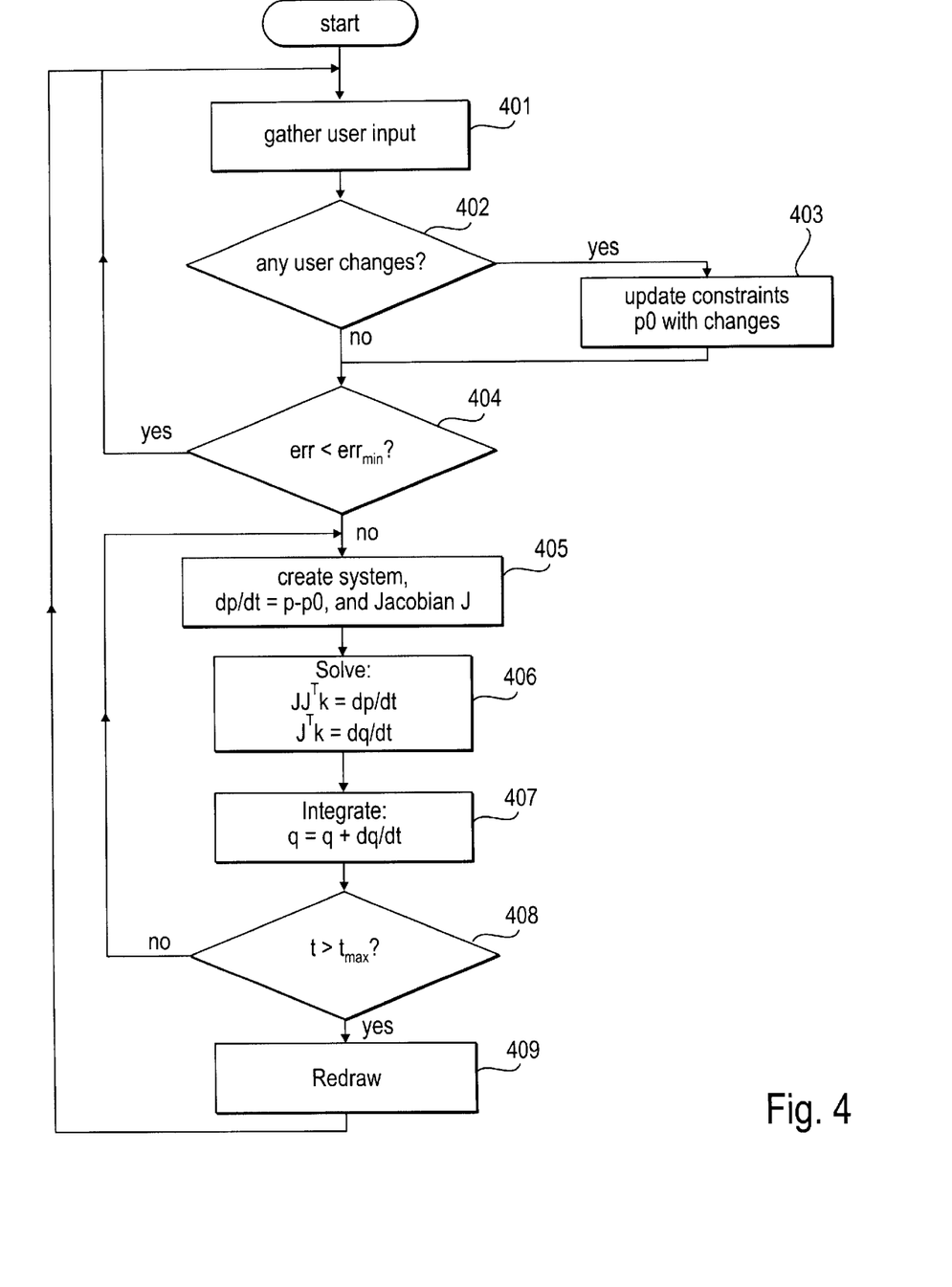
FIG. 4 is a flowchart illustrating the sequence of steps involved in creating a three-dimensional model according to one embodiment of the present invention.

Thus, with reference to FIG. 4, at step 401 user input regarding the addition of constraints is gathered and used to determine (step 402) whether any changes have been implemented. If so, then at step 403, the constraints p0 are updated with those changes. To ensure frequent enough user feedback, the current state of q may be redrawn whenever a predetermined time period has expired (see step 409, below). Then, at step 404, the present invention seeks to minimize the error or energy according to the above procedures.

When a minimum error (or energy) state has been achieved, the Jacobian matrix is created (step 405) and solutions for dp/dt and dq/dt are obtained (step 406). Next, the quantity q is integrated over time (step 407) and, periodically (step 408) an updated parameter vector q is used to redraw (step 409) the wireframe representation to provide the user with visual feedback.

Thus, the technique of the present invention begins with three inputs: First, the Jacobian at some time $t_0$ (called J); second, the desired number of parameters "m" which are allowed to change as a result of the user input; and third the constraints that have changed since the last solution was found (called p0*). The present invention then generates a parameter selection q*, which has fewer or equal elements to the target number of parameters m.

Figure 5:
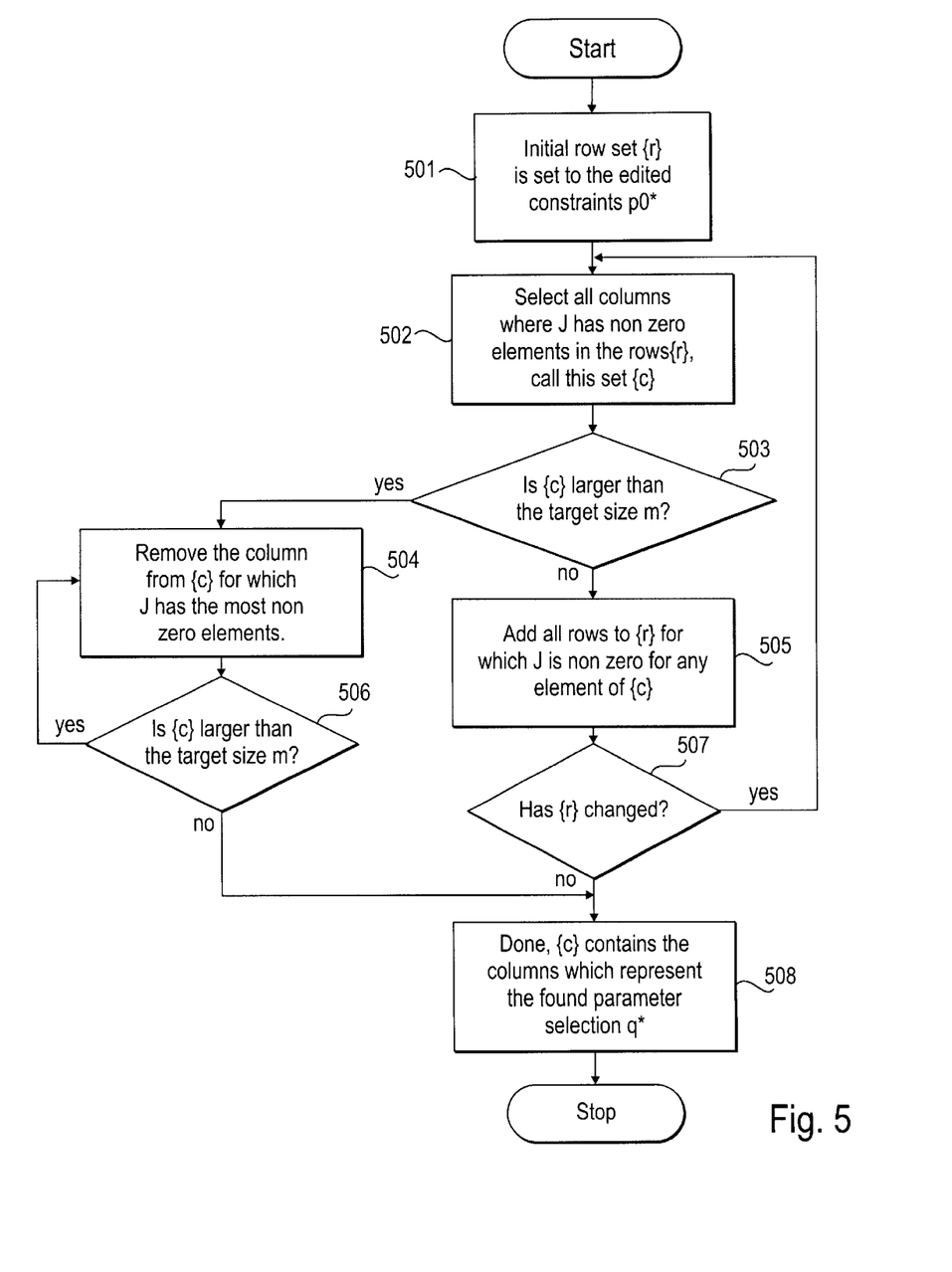
FIG. 5 is a flowchart illustrating the sequence of steps involved in computing a Jacobian matrix according to one embodiment of the present invention.

Referring now to FIG. 5, the process for the creation of the Jacobian is illustrated. Initially, step 501, a row set {r} is created which corresponds to the rows of J that represent the constraint p0*. This row set is translated, step 502, into a column set {c} by including all of the columns for which the rows {r} of J have non-zero elements. As this set {c} will, in the general case, not have m elements, it is either grown or shrunk (decision step 503) depending on whether it is smaller or larger, respectively, than m.

When shrinking {c}, the elements for which J has the most non-zero elements are removed until {c} has m elements (steps 504, 506). Then, the process quits (step 508) with that selection.

In order to grow {c}, all the rows for which the columns {c} of J have non-zero elements are added to {r} (step 505) and the process restarts by translating {r} into a new set of {c} (step 502, etc.). If {r} is not changed with this growing step (step 507), the process recognizes that an upper limit has been reached for the number of parameters and stops with the current selection (smaller than m).

Figure 6:
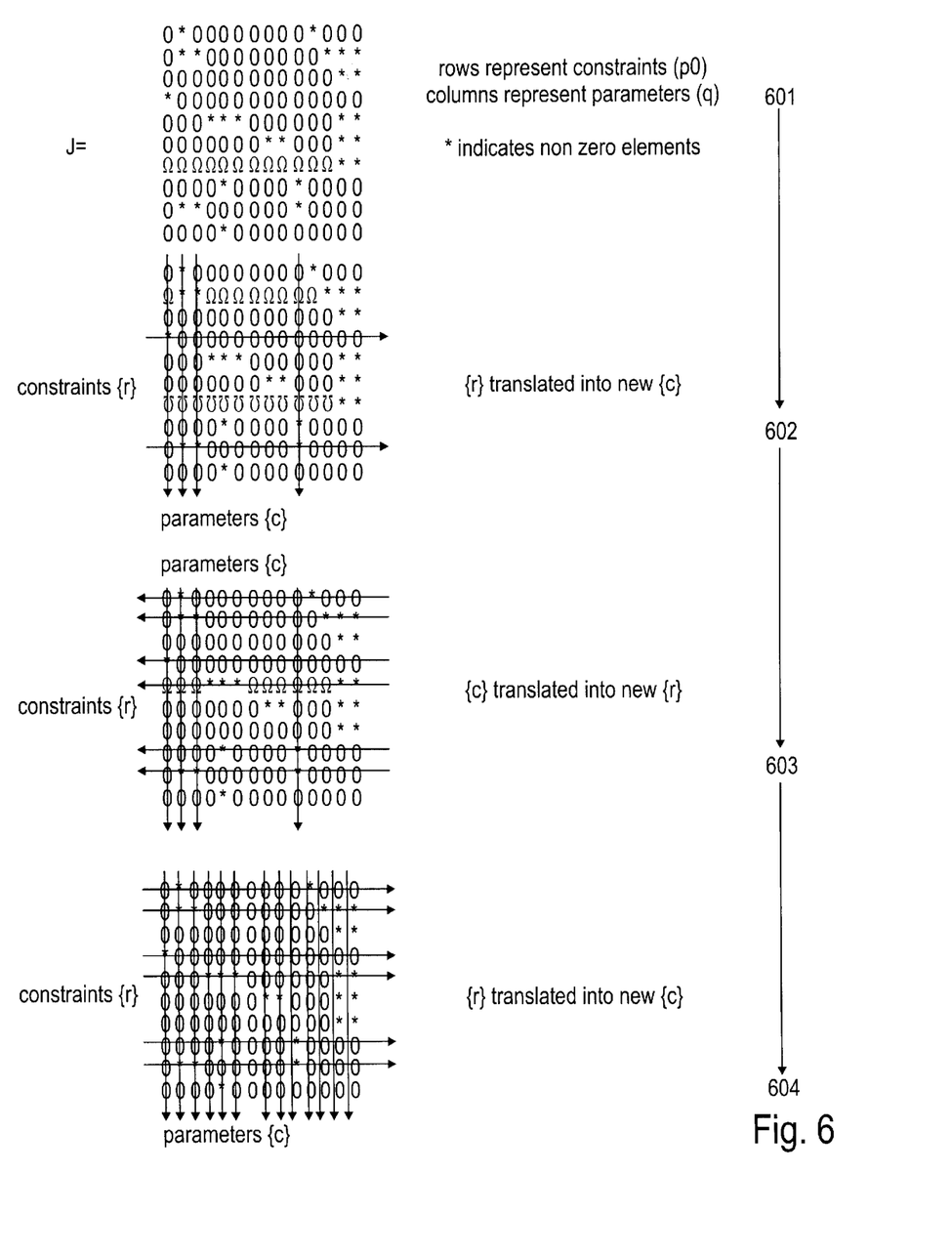
FIG. 6 graphically illustrates the creation of the Jacobian using the process of FIG. 5.

FIG. 6 now shows an example of the above-described process with a Jacobian J of 10 constraints and 14 parameters (step 601). The sparsity of the matrix J is indicated by * and 0, where * indicates a non-zero element. The initial row set {r} is assumed to be {r}={4, 9}, i.e., indicating that the user has modified the model so as to change constraints represented in rows 4 and 9 (numbered from top to bottom) of J. This may, for example, correspond to a user placing a pin constraint at a corner of a box primitive.

The process now translates this row set into a column set by looking for the non-zero elements in rows 4 and 9 (step 602). This yields {c}={1, 2, 3, 10} (where the columns are numbered from left to right). In other words, the process searches for parameters of the primitive(s) which can be updated to reflect the constraint requirements introduced by the user activities. This is done for a minimum number of necessary parameters, up to a target or limit on the number of parameters to be so affected. A limit is chosen to allow for the required redraw rates to keep the process interactive. If the target size (i.e., the number of parameters to limit the computation to) for the illustrated example was 8, the process recognizes that this limit has not yet been met ({c} has only 4 elements). So, {c} is now translated into a new set {r} by including all those row sets which have non-zero elements in any of the columns {c}. This yields a new {r}={1, 2, 4, 5, 8, 9} (step 603). Note that allowing the number of parameters to grow to the preset limit means that a more precise solution can be obtained. In alternative embodiments the process may quit after an initial number of parameters is determined from step 602.

Again the new row set is translated into a new column set $\{c\}$, so that the new $\{c\}=\{1, 2, 5, 6, 8, 9, 10, 11, 12, 13, 14\}$ (step 604). The size of this set is lager than the target size of 8 so it must be pruned by removing those columns which have the most non-zero elements. This eliminates columns 13, 14, 2 and 5. The rationale for removing those columns with the most non-zero elements until a parameter set having the predetermined limit of parameters is obtained is that those parameters (columns) with more non-zero constraints (rows) are more rigidly fixed by the existing constraints on the model. Thus, it would be unwise to alter those parameters for the limited change being introduced by the new user input. The resulting set of parameters is represented by the final column set $\{c\}=\{1, 4, 6, 8, 9, 10, 11, 12\}$. This is the reduced Jacobian $J^*$ which may now be computed by removing the columns which are in $\{c\}$ from J. Matrix $J^*$ may now be used in the above computations (e.g., in equation (3) above).

As indicated, the predetermined limit on the number of parameters which may be used in computing $J^*$ may vary depending on the user's input. For example, if a user is currently providing model information (e.g., by moving a constraint with the two-dimensional input controller), a relatively limited set of parameters may be updated so that a fast redraw rate may be maintained. In such situations, it is expected that users will want rapid feedback so that they can view the results of there inputs, and that such feedback need not be as precise as when a static representation of the model is being viewed. Alternatively, when a static presentation of the model is what is required, a large number of parameters may be solved for, to allow the model to be drawn precisely.

In the present invention, virtual camera and primitive parameters are estimated simultaneously, eliminating the need for a separate camera calibration and estimation step before object measurement can begin. An important aspect of this invention is that even at the point of creation of the first primitive, and at all times thereafter, a current estimate for all the camera and object parameters exists. As the user provides additional information in the form of constraints or additional images, these parameters get updated and more precise, but they are always available. Initially, the parameters are set to a default value, but typically converge to "correct"values after only very little additional user input (e.g., as the projected wireframes are manipulated to correspond to the objects depicted in the underlaid digital image).

The fact that the parameters are always available and are updated incrementally makes it possible to continuously generate an updated wireframe rendering of one or more primitives in response to changing parameters such as camera position. In this way, the user can see the effect of the current parameters and can add new information in the form of constraints where necessary. Including the user in the update loop by providing visual feedback as parameters are updated is significantly different from existing modeling approaches which require that a user enter a great deal of data and then run in a batch mode which may or may not provide a correct solution. e.g., if insufficient or incorrect data was entered. With the methods of the present invention, if insufficient input information has been provided, this fact is readily apparent to the user because the projected wireframes do not (yet) match up with the objects in the underlaid image. To remedy the situation, the user need only add constraints until a sufficient match between the wireframes and the objects in the underlaid image has been achieved. In fact, rather than merely adding arbitrary constraints, users are provided with the kind of visual feedback which allows them to intuitively constrain primitives where needed, e.g., where the projected wireframes are "most wrong"with respect to the underlaid image. These tend to be the most effective (from a mathematical sense) constraints for adapting the model to the image. In the past, modeling schemes generally provided little or no information regarding which constraints were required or how important some constraints were to others. The present scheme, however, immediately provides the user with an indication of how much and what information is required and does so in a highly intuitive fashion.

Also, the incremental approach used in the present invention allows immediate detection and reversal (e.g., via an undo facility as has become common among user applications) of inconsistent user input. Usually, the inputs will be consistent and the parameters will provide a reasonable match to the objects in the image. As an inconsistent input (e.g., in the form of a constraint) is provided by a user, the parameters will diverge, rather than converge to the correct value, and thus the projected wireframe will look less correct or more misshapen than before. In such a case (and as will be readily apparent thanks to the immediate visual feedback provided to the user), the user can simply "undo" the last input and restore the set of inputs to the pervious, consistent state. Of course to accommodate this undo option, one or more previous states will have to be maintained, e.g., in memory.

Thus, an improved computer-assisted technique for providing approximate solutions to photogrammetric problems in interactive applications has been described. Although the foregoing description was set forth with reference to certain illustrated embodiments, it should be appreciated that the present invention is in no way limited to these examples. Instead, the invention should only be measured in terms of the claims which follow.

What is claimed is:

1. A computer-assisted method comprising:
   drawing a three-dimensional representation of a scene using parameterized primitives having constraints which are updated interactively so as to minimize error in constrained locations of the primitives;
   searching for parameters of primitives which can be updated to reflect constraint requirements introduced by user interaction, up to a predetermined maximum set of parameters of primitives; and
   creating a Jacobian matrix for said predetermined maximum set of parameters of primitives.

2. A method, comprising updating a computer-generated model of a scene by determining a maximum number of parameters of one or more primitives which comprise the model to be updated to reflect constraint requirements introduced by user input to the model, the user input coming in the form of manipulation of tile primitives over an image of the scene.

3. The method of claim 2 wherein the maximum number of parameters is chosen to satisfy a desired redraw rate for the model.

4. The method of claim 3 wherein the maximum number of parameters is determined by choosing from among a possible set of parameters to be updated those parameters associated with fewer existing constraints in the model.

5. The method of claim 2, wherein the maximum number of parameters is chosen to satisfy a desired specificity for the model, the specificity corresponding to a degree to which the model accurately represents the image of the scene.

6. The method of claim 5 wherein the maximum number of parameters is determined by choosing from among a possible set of parameters to be updated those parameters associated with fewer existing constraints in the model.

7. The method of claim 2 wherein updating the computer-generated model comprises generating a Jacobian representing the maximum number of parameters.

8. The method of claim 7 wherein generating the Jacobian comprises choosing from a large, sparse matrix representing all of the parameters of the primitives which comprise the model those parameters which are necessary so as to reflect the constraint requirements introduced by the user input to the model.

9. The method of claim 8 wherein the step of choosing comprises:

- determining a column set of the large, sparse matrix corresponding to those parameters affected by the user input to the model; and
- growing or shrinking the column set as required to arrive at the maximum number of parameters.

10. The method of claim 9 wherein shrinking the column set as required comprises eliminating columns corresponding to parameters which are most constrained.

11. The method of claim 2 further comprising displaying visual feedback to the user so as to provide an indication of the constraint requirement introduced by the user input.

12. The method of claim 11 wherein the visual feedback is displayed at a desired redraw rate.

13. The method of claim 12 wherein the maximum number of parameters is chosen to satisfy the desired redraw rate.

14. The method of claim 13 wherein the maximum number of parameters is determined by choosing from among a possible set of parameters to be updated those parameters associated with fewer existing constraints in the model.

15. The method of claim 9 wherein growing the column set as required comprises determining a new column set corresponding to those parameters of the model affected by constraints associated with parameters defined by the column set.

* * * * *